United States Patent Office 3,295,984
Patented Jan. 3, 1967

3,295,984
METHOD OF FEEDING ANIMALS A NON-PROTEIN NITROGEN SOURCE COATED WITH COPOLYMER OF DICYCLOPENTADIENE AND ESTER OF UNSATURATED ACID
Louis I. Hansen, Minneapolis, Minn., assignor to Archer-Daniel-Midland Company, Minneapolis, Minn., a corporation of Delaware
No Drawing. Filed Oct. 22, 1965, Ser. No. 502,513
6 Claims. (Cl. 99—2)

This application is a continuation-in-part of Serial No. 132,383, filed August 18, 1961, now U.S. Patent 3,223,518.

The present invention relates to a method of feeding urea and other non-protein nitrogen sources to ruminant animals. In another aspect, the present invention relates to a livestock feed suitable for ruminant animals which contains, as an essential ingredient, urea coated with a cured coating of a curable copolymer of dicyclopentadiene and ester of unsaturated acid.

The importance of protein in the nutrition of animals has been known for more than a century. As early as 1918, urea was used along with oil seed meals as an indirect source of protein for ruminants. This particular compound (i.e., urea) can be assimilated by ruminants through the action of micro-organisms which multiply in the rumen and the reticulum of the ruminant animal. These microorganisms utilize non-protein nitrogen (e.g., nitrogen contained in urea) and convert it into organismal protein which is in turn digested and absorbed by the host animal. Unfortunately, the use of urea to supplement the protein diet of such animals is characterized by a lack of efficiency in converting this non-protein nitrogen (present in urea) into a useable form. Moreover, urea feeding must be carried out with considerable care to minimize the harm to the host animal which can result when urea is hydrolyzed to form ammonia at a rate greater than the micro-organisms can use it. For these and other reasons, urea must be fed to ruminants under carefully controlled conditions.

I have discovered, and this discovery forms a basis for the present invention, that animal feed supplements such as urea and other non-protein nitrogen sources (e.g., ammonium phosphate) can be effectively fed to ruminants at considerably higher levels than previously expected, provided that the urea is first encapsulated with a cured coating of a curable copolymer of dicyclopentadiene and ester of unsaturated acid. By feeding ruminants in the fashion herein described, I have found a number of advantages to accrue. First, the encapsulating coating (which is water insoluble) prevents the urea from hydrolyzing at too rapid a rate. Consequently, more urea is made available for efficient utilization by the host animal. Secondly, the deleterious side effects which accompany the use of uncoated urea are substantially avoided. Third, the palatability of the non-protein nitrogen source is apparently improved. Fourth, the dietary needs of the host animal can be more effectively met under grazing conditions since more urea can be ingested by the ruminant based on the weight of roughage (i.e., cellulose) consumed by the animal.

The dietary or feed supplement (e.g., urea) to be coated according to the present invention will ordinarily be in granular, pelletized or prilled form. For the purposes of this invention, the choice of form (e.g., granules or prills) is not critical and these forms can be considered equivalent. Mixtures of various non-protein nitrogen sources can be used. The granules form the core of the coated feed supplements described herein. According to this invention, these granules are coated with at least one coating of a curable copolymer of dicyclopentadiene and ester of unsaturated acid. The copolymer can be conveniently applied to the granules in the form of a rapid-drying, solvent solution. Where more than one coating or layer of these particular copolymers is employed, it is desirable that each coating be dried at least until the point of incipient gelation prior to applying any subsequent coatings. These particular coatings (i.e., coatings of the dicyclopentadiene copolymer) can be employed alone or in combination with other coating materials which may be organic or inorganic in nature. It is especially desirable to employ a plurality of coatings of one or more types. In a particularly preferred embodiment, a plurality of coatings (e.g., three or more coatings) of the dicyclopentadiene copolymer are employed. The products of this invention are typically dry, free-flowable, coated granules.

Film-forming copolymers of dicyclopentadiene and esters of unsaturated acids (e.g., soybean oil) are known to the art. These copolymers are commercially available under such trademarks as Admerol, Dryfol, Var, etc. Particularly outstanding results are obtained when copolymers of dicyclopentadiene and polyhydric alcohol esters of unsaturated fatty acids are employed. Suitable esters include linseed oil, soybean oil, tung oil, fish oils, pentaerylthritol ester of tall oil, alcoholysis products of fatty-triglycerides, and the like. Fatty triglycerides (e.g., linseed oil, soybean oil, and the like) are especially preferred. If desired, these fatty acid esters (e.g., soybean oil) can be modified by, for example, reaction with maleic acid (or anhydride) as is common in the art. Best results are generally obtained when the dicyclopentadiene copolymers contain from 8 to 60 weight percent of dicyclopentadiene. More frequently, the amount of dicyclopentadiene will be from 12 to 50 weight percent, e.g., from about 18 to about 45 weight percent dicyclopentadiene.

When urea (or some other non-protein nitrogen source) is encapsulated or coated with these dicyclopentadiene copolymers, the cured coatings provide a water insoluble shield around the urea and perform a metering function which delays and effects the slow and gradual release of the non-protein nitrogen source. By varying the number of coatings and the total weight of coatings, it is possible to control the rate of release. After ingestion, the coating or shell which surrounds the core of urea or other non-protein nitrogen source has been noted to remain intact. This is contrary to what would normally be expected. This fact has been established by experimentation with fistulated sheep. This coating or shell has not been shown to produce any undesirable side effects in the host animal and is eventually excreted.

In coating urea or some other non-protein nitrogen source, the dicyclopentadiene copolymers are diluted with a rapid drying solvent, frequently to a non-volatile content of from 30 to 80 weight percent, e.g., 40 to 60 weight percent. Suitable solvents include those solvents already well known to the coatings art, e.g., xylene, toluene, Cellosolve acetate, butyl alcohol, and the like. This solvent solution is then applied in film form to the feed supplement to be coated. If desired, this solution can optionally include wetting agents, plasticizing agents, coloring agents, driers, stabilizers, and the like. Of course, consideration must always be given to the ultimate effect of these adjuvants on the host animal.

In coating animal feed supplementals according to the present invention, I have found that substantial benefits are obtained when a plurality of coatings (of one or more types) are employed, as opposed to a single coating. I have found that a single coating, regardless of amount, is generally inferior to a plurality of coatings of the same type, when the same total coating weight is employed. Although each of the coatings (on a 100% solids basis) can range from as little as, for example, 0.1 percent up to as much as 10 percent or more, based on the weight of the core, I have found that individual coating weights of from 0.1 to 4 percent, on the same basis, are particularly well suited for the practice of my invention. Commonly, I apply a plurality of coatings of dicyclopentadiene copolymer to a granular feed supplement, each in the amount of about 0.25 to 3 percent (on the same basis) and repeat these applications until the total coating weight is sufficient to provide a desired rate of release of the water soluble components contained in the feed supplement. For ruminant feeding, the total weight of coatings (of all types) will usually be from 2 to 12 percent, more usually from 3 to 10 percent, e.g., 4 to 8 percent, based on the weight of the uncoated feed supplement (e.g., di-ammonium phosphate). The total coating weight is also a function of the particle size of the feed supplement is to be coated, a function of the surface area and smoothness of the feed supplement particles, etc.

It should be noted that each of the coatings employed by me will not always appear as a separate, discrete coating on the final product. Further, in applying these coatings, any particular coating may not, by itself, completely encapsulate the core of, for example, urea. However, the combined effect of the plurality of coatings employed by me is to completely surround or encapsulate the core of feed supplement with a water insoluble skin. When one realizes that I employ at least two coatings, and preferably more coatings, the degree of encapsulation and film integrity obtained by me can be appreciated. Products prepared according to the preferred form of my invention are completely encapsulated or surrounded with a water insoluble film. When the total coating weight is applied in the form of a plurality of thin films (this is preferable), I prefer to employ at least three and preferably four or more individual coatings.

In coating feed supplements, I employ the dicyclopentadiene copolymers in the form of a rapid drying solvent solution, as previously noted. Improved results are obtained if the granules are pre-heated to, for example, 100° to 300° F. Of course, consideration must be given to the decomposition temperature of the supplement (e.g., above 230° F. urea begins to sinter). Each successive coating or layer should be dried at least to the point of incipient gelation so that it will not be lifted by solvent present in subsequent wet coatings. I have found that tumbling and gently cascading the supplement granules together as the wet coatings are dried improves the rate of drying, improves film integrity, and assists in completely encapsulating the supplement. Agglomeration is also avoided and product durability is improved. Tumbling also helps spread the copolymer over the surface of the supplement granules by a rubbing or smearing action. When the final coating has been applied, the plurally coated feed supplement is then dried and cured to a tack-free state. The final product must be tack-free to avoid compaction and agglomeration problems. The net result is an animal feed supplement comprising a core of feed supplement surrounded by a plurality of coatings. These coating provide a water insoluble shell or shield around the feed supplement and allow for the gradual release of water soluble nutrients, apparently as a result of osmotic and enzymatic action.

While this invention has been described with reference to a particular coating material, it is to be understood that I contemplate that the coating materials of this invention could be used in conjunction with other coating materials. Thus, where granules having a highly irregular surface are to be coated, I would suggest that this surface be treated in some fashion (e.g., as by pre-coating the granules) to thereby form smoother granules. In this manner, it is possible to reduce the amount of the more expensive coating material which is required to obtain the same degree of encapsulation, film integrity, and the desired rate of release. Similarly, over-coatings can be utilized to provide better eye appeal, taste, and the like. In any event, it is to be understood that my invention, in its preferred form, involves providing a granular feed supplement with a plurality of coatings, at least one of which is of the particular coating material herein described.

Other coating materials which may be used in conjunction with the dicyclopentadiene copolymers include linseed oil, bodied linseed oil, oil-modified alkyd resins, varnishes, phenol formaldehyde resins, furan resins, urea formaldehyde resins, butadiene-linseed oil copolymers, casein, resin-modified alkyds, copolymer alkyds, petroleum resins, wax, epoxidized materials, cured with acids or partial esters, epoxy resins cured with polyamines, etc. Again, consideration must be given to the effect of these materials on the host animal.

The present invention will be further understood by reference to the following specific examples which include a preferred embodiment. Unless otherwise indicated, all parts and percentages are by weight. In these examples, the equipment used for coating the feed supplements was a horizontally mounted drum about 36 inches long and 16 inches in diameter. Means were provided to allow hot air to be passed axially through the drum. The air flow rate could be varied from about 100–500 c.f.m. Typically, the air flow rate was about 200–350 c.f.m. An open gas flame was used to pre-heat the air. Although the temperature of the air could be as high as 300° F. or higher, it was usually kept within the range of 140°–220° F. During coating operations, the drum was rotated at a peripheral speed which could be varied from 50 inches per minute to 500 inches per minute. Typically, the speed was about 130–140 inches per minute. Baffles located within the drum were used to cascade the granules and to reduce the tendency of the granules (or prills, etc.) to ball-up during the coating operation.

Leach rates were determined in the following manner: a twenty (20) gram sample of coated feed supplement was placed in an 8 ounce screw-top bottle and 100 ml. of water was then added. The bottle was sealed and then shaken gently until all the coated granules were wet. The jar was then allowed to stand at room temperature (e.g., 70–75° F.) for a pre-selected period of time (e.g., 24 hours). At the end of this time, the contents of the bottle were again shaken to obtain a uniform solution. The solution was then passed through filter paper to remove undissolved particles, etc. A 5 ml. portion of the filtrate was then dried. The weight of the dry residue (if any) in grams, multiplied by 100 gave the percent of material leached from the feed supplement (based on the total weight of the coated feed supplement before leaching). A temperature of about 200° F. was used for drying the filtrate.

PREPARATION OF COATED FEED SUPPLEMENTS

*Example I*

Granular, feed grade urea was coated with 3% of a dicyclopentadiene copolymer in the following manner:

The uncoated urea was placed in the rotating drum. The coating process was begun without first allowing the granules to pre-heat. At about the same time, air pre-heated to 160°–170° F. was passed through the drum. Each coating or layer was applied to the urea by introducing the necessary amount of copolymer through a long piece of aluminum tubing and spraying the tumbling urea granules with a thin stream of the copolymer. Two coatings of the copolymer were applied, each amounting to 1½% based on the weight of the uncoated urea. A fifteen-minute interval was allowed between the two coatings so that the first coating could dry at least to the point of incipient gelation before the second coating was applied. The peripheral drum speed was approximately 130–140 inches per minute. During the coating process, the temperature of the granules rose to about 160° F. After the last (i.e., the second) coating of the copolymer had been applied, the heat was removed and the hot, coated granules were allowed to tumble (with air still coming through the drum) until the coated urea granules were tack-free. Then, the coated urea was removed from the drum and tested. The six-hour leach was 61.7% and the 24-hour leach was 92%. This is in strong contrast to uncoated urea which is substantially completely leached in a matter of only a few minutes.

The coating material used in this example was a rapid drying solvent solution of a copolymer of (1) dicyclopentadiene and (2) a maleinized vegetable oil. This copolymeric resin is commercially available under the trade mark Admerol 351. The copolymer contained about 30–40% dicyclopentadiene, with the remainder being the modified vegetable oil.

*Example II*

The procedure of Example I was repeated with two exceptions. First, a total of 4½% of dicyclopentadiene copolymer was applied in the form of three coatings, each amounting to 1½%. Second, the first coating was not applied until the urea granules had been pre-heated to 130° F. By the time the coating operation had been completed, the temperature of the granules had risen to 160°–170° F. This product had a 6-hour leach of 33.8% and a 24-hour leach of 46%.

*Example III*

The procedure of Example I was repeated with two exceptions. First, a total of 6% of the dicyclopentadiene copolymer was applied in the form of four coatings, each amounting to 1½% based on the weight of the uncoated urea. Second, coating operations were not begun until the temperature of the urea had reached 160°–170° F. This same temperature was maintained while all coatings were applied. The product produced in this example had a 6-hour leach of 15% and a 24-hour leach of 27%.

*Example IV*

A commercially available clay-coated, granular urea coated with 7% of dicyclopentadiene copolymer following the procedure of Example I. Air at 185°–200° F. was used and the granules were pre-heated to 180°–190° F. prior to beginning the coating operation. First, four coatings of 1½% each were applied. Then, one coating of 1% was applied. A 10-minute interval was allowed between each of the coating applications to ensure that the previous coating (in each instance) had dried at least to the point of incipient gelation. The 24-hour leach of this product was 25.4%. In this example, the dicyclopentadiene copolymer (Admerol 351) was used in the form of a 50 percent non-volatile solution in mineral spirits.

*Example V*

Example IV was repeated to substantially duplicate the product of Example IV. This product had a 24-hour leach of 26.8%.

*Example VI*

Granular 16–48–0 di-ammonium phosphate, which had been screened to remove all particles over 10 mesh in size, was coated with 5% of a copolymer of dicyclopentadiene and an unsaturated ester. These granules were preheated to 220° F. before beginning the coating operation. This temperature was maintained during coating. The coatings were applied in the following manner: First, two coatings were applied, each amounting to 1½%; second, two coatings were applied, each amounting to 1%. A 10-minute interval was allowed between each coating. The 24-hour leach for this product was 16%.

FEEDING COATED FEED SUPPLEMENTS TO ANIMALS

*Example VII*

The products prepared in Examples I–VI were fed to a variety of ruminant animals under carefully-controlled experimental conditions. The results obtained by these tests showed that the coated feed supplements were more effective than the corresponding uncoated feed supplements. Because of the coating, the coated feed supplements (e.g., coated urea) could be fed at significantly higher levels than, for example, uncoated urea. Advantages were noted in terms of the weight increase of the host animals, general increase or improvement in health, larger percentage of twins (which means more dollars for the farmer), lack of noticeable deleterious side effects, an apparent improvement in palatability, etc. For use in these tests, the coated feed supplements were usually blended with cellulosic feed materials such as hay, alfalfa, cereal grass, and grain to thereby form livestock feeds. However, such blending is not critical. If desired, the coated feed supplements can be fed to the animals and then the animals can be fed the roughage (e.g., under grazing conditions). These tests also indicated that coated feed supplements having a leach of between 15 and 35%, more preferably between 20 and 30%, in 24 hours were the most effective.

Having described the present invention with a certain degree of particularity, it will be realized that numerous minor changes and variations, falling within the spirit and scope of this invention, will become obvious to those skilled in the art. It is not intended that this invention be limited to any of the specific coating materials which have been mentioned as specific examples, nor by any of the specific proportions which have been given for the sake of illustration, but it is intended to claim all novelty inherent in the invention, as well as all obvious modifications and variations thereof.

What is claimed is:

1. In the method of supplementing the diet of animals wherein non-protein nitrogen sources are fed to the animals as feed supplements, the improvement which comprises feeding the animals a coated non-protein nitrogen source, said coated non-protein nitrogen source comprising a core of a granular non-protein nitrogen source surrounded by at least one cured coating of a curable copolymer of dicyclopentadiene and ester of unsaturated acid.

2. The method of claim 1 wherein said non-protein nitrogen source is urea.

3. The method of claim 1 wherein said coated non-protein nitrogen source is surrounded by a plurality of coatings each amounting to from 0.1 to 4% by weight based on the weight of the core and wherein said ester of unsaturated acid is a maleinized fatty-triglyceride.

4. The method of claim 3 wherein a plurality of coatings of the dicyclopentadiene copolymer are present; wherein said copolymer contains from 12 to 50 weight percent dicyclopentadiene; and wherein the total weight of coatings of all types is from 3 to 10% by weight, based on the weight of the core.

5. The method of claim 2 wherein said coated urea is fed to said animals at a higher concentration than that normally used for uncoated urea, said concentration being measured as pounds of urea ingested per pound of roughage.

6. The method of claim 1 wherein said non-protein nitrogen source is a member of the group consisting of urea, ammonium phosphate, and di-ammonium phosphate.

References Cited by the Examiner

UNITED STATES PATENTS

| | | | |
|---|---|---|---|
| 2,766,283 | 10/1956 | Darden | 99—2 |
| 2,806,773 | 9/1957 | Pole | 99—4 |
| 3,223,518 | 12/1965 | Hansen | 71—64 |

A. LOUIS MONACELL, *Primary Examiner.*

D. DONOVAN, *Assistant Examiner.*